United States Patent
Martin et al.

(10) Patent No.: US 11,685,798 B2
(45) Date of Patent: Jun. 27, 2023

(54) POLYETHYLENE FORMULATIONS FOR LARGE PART BLOW MOLDING APPLICATIONS

(71) Applicant: Dow Global Technologies LLC, Midland, MI (US)

(72) Inventors: Peter S. Martin, Houston, TX (US); Yijian Lin, Pearland, TX (US); Angela I. Padilla-Acevedo, Lake Jackson, TX (US); Roger L. Kuhlman, Lake Jackson, TX (US); Shadid Askar, Houston, TX (US); Mridula Kapur, Lake Jackson, TX (US); Todd A. Hogan, Midland, MI (US); Joel D. Wieliczko, Charleston, WV (US); Chuan C. He, Dunbar, WV (US)

(73) Assignee: Dow Global Technologies LLC, Midland, MI (US)

(*) Notice: Subject to any disclaimer, the term of this patent is extended or adjusted under 35 U.S.C. 154(b) by 375 days.

(21) Appl. No.: 17/260,271

(22) PCT Filed: Jul. 18, 2019

(86) PCT No.: PCT/US2019/042398
§ 371 (c)(1),
(2) Date: Jan. 14, 2021

(87) PCT Pub. No.: WO2020/028059
PCT Pub. Date: Feb. 6, 2020

(65) Prior Publication Data
US 2021/0301049 A1   Sep. 30, 2021

Related U.S. Application Data

(60) Provisional application No. 62/712,527, filed on Jul. 31, 2018.

(51) Int. Cl.
*C08F 210/16* (2006.01)
*C08F 10/02* (2006.01)
*C08F 4/6592* (2006.01)

(52) U.S. Cl.
CPC ........ *C08F 210/16* (2013.01); *C08F 4/65922* (2013.01); *C08F 2500/01* (2013.01); *C08F 2500/02* (2013.01); *C08F 2500/05* (2013.01); *C08F 2500/07* (2013.01); *C08F 2500/12* (2013.01); *C08F 2500/13* (2013.01); *C08F 2500/19* (2013.01)

(58) Field of Classification Search
CPC .... C08F 210/16; C08F 10/02; C08F 2500/07; C08F 2500/12; C08F 2500/02
See application file for complete search history.

(56) References Cited

U.S. PATENT DOCUMENTS

| | | |
|---|---|---|
| 3,709,853 A | 1/1973 | Karapinka |
| 4,003,712 A | 1/1977 | Miller |
| 4,011,382 A | 3/1977 | Levine et al. |
| 4,302,566 A | 11/1981 | Karol et al. |
| 4,543,399 A | 9/1985 | Jenkins, III et al. |
| 4,665,208 A | 5/1987 | Welborn et al. |
| 4,874,734 A | 10/1989 | Kioka et al. |
| 4,882,400 A | 11/1989 | Andre et al. |
| 4,908,463 A | 3/1990 | Bottelberghe |
| 4,924,018 A | 5/1990 | Bottelberghe |
| 4,952,540 A | 8/1990 | Kioka et al. |
| 4,968,827 A | 11/1990 | Davis |
| 5,041,584 A | 8/1991 | Crapo et al. |
| 5,091,352 A | 2/1992 | Kioka et al. |
| 5,103,031 A | 4/1992 | Smith |
| 5,157,137 A | 10/1992 | Sangokoya |
| 5,204,419 A | 4/1993 | Tsutsui et al. |
| 5,206,199 A | 4/1993 | Kioka et al. |
| 5,235,081 A | 8/1993 | Sangokoya |
| 5,248,801 A | 9/1993 | Sangokoya |

(Continued)

FOREIGN PATENT DOCUMENTS

| | | |
|---|---|---|
| CL | 20060001930 | 7/2006 |
| EP | 279586 A2 | 8/1988 |

(Continued)

OTHER PUBLICATIONS

Chilean Examination Report, dated Jan. 12, 2022, pertaining to application No. 2021-000188 16 pages.

(Continued)

*Primary Examiner* — Rip A Lee
(74) *Attorney, Agent, or Firm* — Dinsmore & Shohl LLP

(57) ABSTRACT

In various embodiments, a polyethylene formulation has a density of greater than 0.940 g/cm³ when measured according to ASTM D792, and a high load melt index ($I_{21}$) of 1.0 g/10 min to 10.0 g/10 min when measured according to ASTM D1238 at 190° C. and a 21.6 kg load. Moreover, the polyethylene formulation has a peak molecular weight ($M_{p(GPC)}$) of less than 50,000 g/mol, a number average molecular weight ($M_{n(GPC)}$) of less than 30,000 g/mol, and a weight fraction (w1) of molecular weight (MW) less than 10,000 g/mol of less than or equal to 10.5 wt %, as determined by Gel Permeation Chromatography (GPC). Articles made from the polyethylene formulation, such as articles made by blow molding processes are also provided.

19 Claims, 1 Drawing Sheet

(56) References Cited

U.S. PATENT DOCUMENTS

| | | | |
|---|---|---|---|
| 5,292,845 A | 3/1994 | Kawasaki et al. | |
| 5,326,835 A | 7/1994 | Ahvenainen et al. | |
| 5,329,032 A | 7/1994 | Tran et al. | |
| 5,352,749 A | 10/1994 | Dechellis et al. | |
| 5,541,270 A | 7/1996 | Chinh et al. | |
| 5,648,310 A | 7/1997 | Wasserman et al. | |
| 5,665,818 A | 9/1997 | Tilston et al. | |
| 5,677,375 A | 10/1997 | Rifi et al. | |
| 5,688,880 A | 11/1997 | Spencer et al. | |
| 5,770,755 A | 6/1998 | Schertl et al. | |
| 5,889,128 A | 3/1999 | Schrock et al. | |
| 5,965,477 A | 10/1999 | Sivaram et al. | |
| 5,972,510 A | 10/1999 | O'Hare et al. | |
| 6,034,187 A | 3/2000 | Maehama et al. | |
| 6,274,684 B1 * | 8/2001 | Loveday | C08F 10/02 526/160 |
| 6,380,311 B1 * | 4/2002 | Razavi | C08L 23/0815 525/240 |
| 6,472,484 B1 | 10/2002 | Abe et al. | |
| 6,534,604 B2 | 3/2003 | Loveday et al. | |
| 7,432,328 B2 * | 10/2008 | Jaker | C08L 23/06 525/240 |
| 8,501,882 B2 * | 8/2013 | Ding | C08F 10/00 526/348 |
| 8,680,218 B1 * | 3/2014 | Yang | C08F 210/16 526/86 |
| 8,911,872 B2 | 12/2014 | Vantomme et al. | |
| 8,957,168 B1 * | 2/2015 | Yang | C08F 4/649 526/348 |
| 9,000,116 B2 | 4/2015 | Hirase et al. | |
| 9,034,991 B2 * | 5/2015 | Hlavinka | C08F 210/16 526/348 |
| 9,156,970 B2 | 10/2015 | Hlavinka et al. | |
| 9,181,370 B2 * | 11/2015 | Sukhadia | C08J 5/18 |
| 9,273,170 B2 * | 3/2016 | Hlavinka | C08L 23/0815 |
| 9,475,898 B2 | 10/2016 | Rohatgi et al. | |
| 9,505,161 B2 * | 11/2016 | Sun | C08F 10/02 |
| 9,505,856 B1 * | 11/2016 | Schwerdtfeger | B01J 35/1047 |
| 9,540,457 B1 * | 1/2017 | Ding | C08F 210/16 |
| 9,550,849 B2 * | 1/2017 | Hlavinka | C08F 210/16 |
| 9,758,599 B2 * | 9/2017 | Ding | C08F 210/16 |
| 9,845,367 B2 * | 12/2017 | Ding | C08F 210/16 |
| 9,975,977 B2 | 5/2018 | Kim et al. | |
| 10,358,506 B2 * | 7/2019 | Ding | C08L 23/0815 |
| 11,377,541 B2 * | 7/2022 | Cruz | C08F 4/6592 |
| 2007/0027276 A1 | 2/2007 | Cann et al. | |
| 2017/0096512 A1 | 4/2017 | Hlavinka et al. | |
| 2018/0079845 A1 | 3/2018 | Doufas et al. | |

FOREIGN PATENT DOCUMENTS

| | | |
|---|---|---|
| EP | 511665 A2 | 11/1992 |
| EP | 516476 A2 | 12/1992 |
| EP | 594218 A1 | 4/1994 |
| EP | 664301 A1 | 7/1995 |
| EP | 767184 A1 | 4/1997 |
| EP | 794200 A2 | 9/1997 |
| EP | 802202 A1 | 10/1997 |
| EP | 802203 A1 | 10/1997 |
| EP | 893454 A1 | 1/1999 |
| WO | 9410180 A1 | 5/1994 |
| WO | 9947598 A1 | 9/1999 |
| WO | 9948605 A1 | 9/1999 |
| WO | 9950311 A1 | 10/1999 |
| WO | 9960033 A1 | 11/1999 |
| WO | 2010063444 A1 | 6/2010 |
| WO | 2015138673 A1 | 9/2015 |
| WO | 2015195188 A1 | 12/2015 |
| WO | 2015195189 A1 | 12/2015 |
| WO | 2016172197 A1 | 10/2016 |

OTHER PUBLICATIONS

Communication pursuant to Article 94(3) EPC, dated Sep. 2, 2022, pertaining to EP patent application No. 19756269.7 4 pages.

International Search Report and Written Opinion pertaining to PCT/US2019/042398, dated Oct. 21, 2019.

Randall, J.C., "A Review of High Resolution Liquid Carbon Nuclear Magnetic Resonance Characterizations of Ethylene-Based Polymers", Rev. Macromol. Chem. Phys., 1989, C29, 201-317.

Williams et al., "The Construction of a Polyethylene Calibration Curve for Gel Permeation Chromatography Using Polystyrene Fractions", J. Polym. Sci., Polym. Let., 1968, 6, 621.

Chilean Examination Report, dated Dec. 16, 2022, pertaining to application No. 2021-000188 12 pages 12 pages.

* cited by examiner

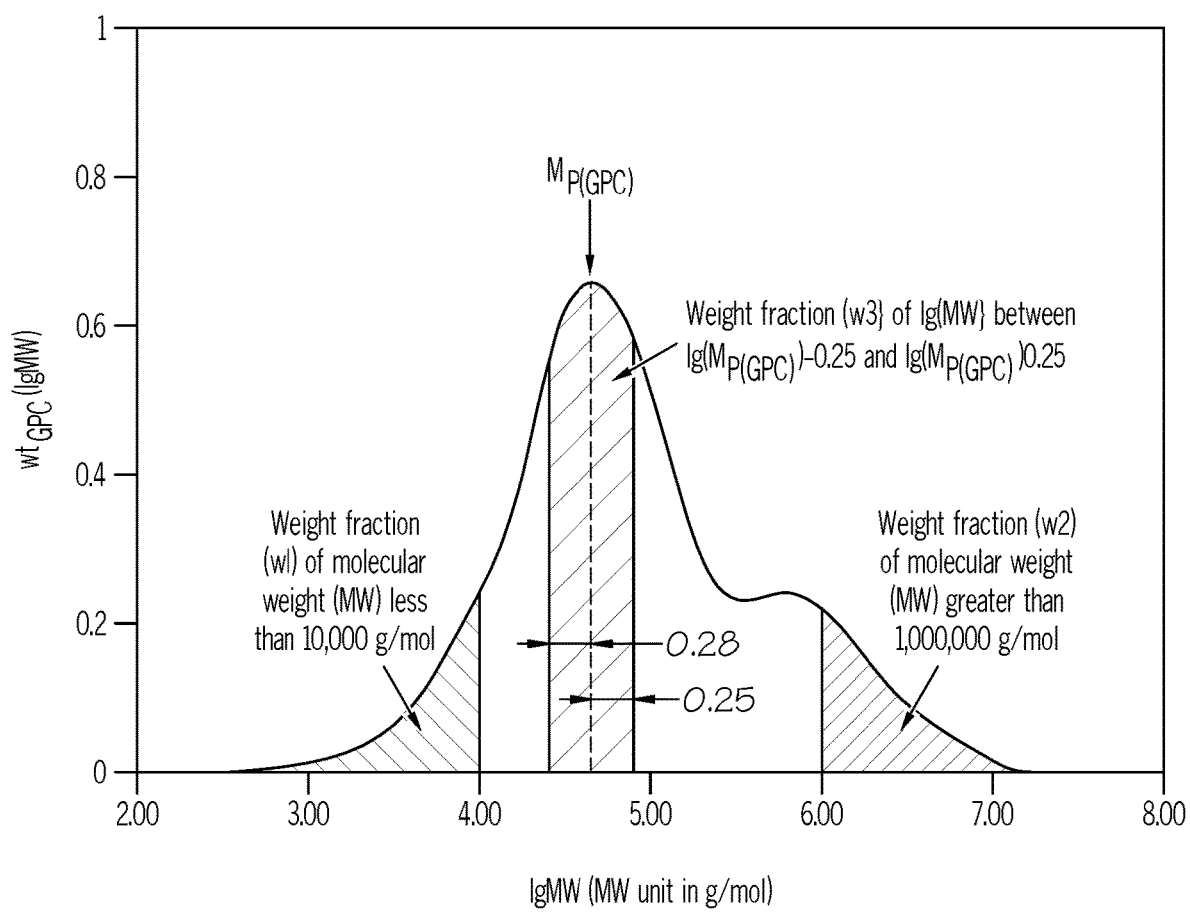

POLYETHYLENE FORMULATIONS FOR LARGE PART BLOW MOLDING APPLICATIONS

CROSS-REFERENCE TO RELATED APPLICATIONS

This application is a National Stage Entry under 35 U.S.C. § 371 of International Patent Application No. PCT/US2019/042398, filed Jul. 18, 2019, which claims priority to U.S. Application Ser. No. 62/712,527, filed Jul. 31, 2018, the entire disclosures of which are hereby incorporated by reference.

TECHNICAL FIELD

Embodiments of the present disclosure generally relate to polyethylene formulations. More specifically, embodiments of the present disclosure relate to articles including polyethylene formulations which provide improved environmental stress cracking resistance (ESCR) while maintaining die swell properties.

BACKGROUND

In manufacturing molded articles, such as plastic closure devices and plastic containers, the environmental stress cracking resistance (ESCR) of a molded article is very important to prevent an uncontrolled release of the container materials. It is also important that the molded article possess adequate stiffness, demonstrated by flexural modulus, to prevent deformation when stacked during transportation and storage. The extrusion blow molding process is widely used to fabricate hollow molded containers. High density polyethylene (HDPE) is known to be used in manufacturing these molded articles to achieve sufficient article stiffness. However, as density is increased, the ESCR decreases. Conventional HDPE for large part blow molding applications is made with a chromium catalyst, which delivers the required resin processing properties characterized by swell. However, the chromium catalyzed HDPE resins typically have low ESCR.

Accordingly, ongoing needs may exist for HDPE formulations to be used in manufacturing molded articles that exhibit sufficient stiffness, proper shrinkage, adequate die swell properties and an improved ESCR for blow molded articles.

SUMMARY

Embodiments of the present disclosure address these needs by utilizing a polyethylene formulation comprising a multimodal HDPE formulation and a bimodal catalyst to maintain the die swell properties while exhibiting improved ESCR.

In a first embodiment of the present disclosure, a polyethylene formulation is provided. The polyethylene formulation has a density of greater than 0.940 g/cm3 when measured according to ASTM D792, and a high load melt index (I21) of 1.0 g/10 min to 10.0 g/10 min when measured according to ASTM D1238 at 190° C. and a 21.6 kg load. Moreover, the polyethylene formulation has a peak molecular weight (Mp(GPC)) of less than 50,000 g/mol, a number average molecular weight (Mn(GPC)) of less than 30,000 g/mol, and a weight fraction (w1) of molecular weight (MW) less than 10,000 g/mol of less than or equal to 10.5 wt %, as determined by Gel Permeation Chromatography (GPC).

In a second embodiment, an article made from the polyethylene formulation is provided. The article may be made by a blow molding process.

These and additional features provided by the embodiments of the present disclosure will be more fully understood in view of the following detailed description, in conjunction with the drawings.

BRIEF DESCRIPTION OF THE DRAWINGS

The following detailed description of specific embodiments of the present disclosure can be best understood when read in conjunction with the drawings enclosed herewith.

FIG. 1 is a plot of the molecular weight distribution for the polyethylene formulations of Example 2 as determined by Gel Permeation Chromatography (GPC).

The embodiments set forth in the drawings are illustrative in nature and not intended to be limiting to the claims. Moreover, individual features of the drawings will be more fully apparent and understood in view of the detailed description.

DETAILED DESCRIPTION

Embodiments of the present disclosure are directed to polyethylene formulations and articles made therefrom that provide improved ESCR performance. The embodiments of the polyethylene formulation include a density of greater than 0.940 g/cm3 when measured according to ASTM D792, and a high load melt index (I21) of 1.0 g/10 min to 10.0 g/10 min when measured according to ASTM D1238 at 190° C. and a 21.6 kg load. Moreover, the polyethylene formulation has a peak molecular weight (Mp(GPC)) of less than 50,000 g/mol, a number average molecular weight (Mn(GPC)) of less than 30,000 g/mol, and a weight fraction (w1) of molecular weight (MW) less than 10,000 g/mol of less than or equal to 10.5 wt %, as determined by Gel Permeation Chromatography (GPC).

Another embodiment of the present invention includes, among other things, an article produced from the polyethylene formulation comprising a blow molded article or a molded article, which provides, among other things, improved ESCR and the required swell properties. The following description of the embodiments is illustrative in nature and is in no way intended to be limiting in its application or use.

The term "polymer" refers to a polymeric compound prepared by polymerizing monomers, whether of the same or a different type. The generic term polymer thus embraces the term "homopolymer," usually employed to refer to polymers prepared from only one type of monomer as well as "copolymer" which refers to polymers prepared from two different monomers. The term "interpolymer," as used herein, refers to a polymer prepared by the polymerization of at least two different types of monomers. The generic term interpolymer thus includes copolymers, and polymers prepared from more than two different types of monomers, such as terpolymers.

The term "multimodal," as used herein, means that the molecular weight distribution (MWD) in a GPC curve exhibits two or more component polymers, for example, two or more peaks or wherein one component polymer may even exist as a hump, shoulder, or tail, relative to the MWD of the other component polymers; or in the alternative, wherein two or more components may have only one single peak with no bumps, shoulders, or tails.

As used herein, "bimodal" means compositions that can be characterized by having at least two (2) polymer subcomponents or "fractions" with varying densities and weight averaged molecular weights, and may also have different melt index values. In one embodiment, bimodal may be defined by having at least two distinct peaks in a Gel Permeation Chromatography (GPC) chromatogram showing the molecular weight distribution. In another embodiment, bimodal may be defined by having at least two distinct peaks in a Crystallization Elution Fractionation (CEF) chromatogram showing the short chain branching distribution. Bimodal includes resins having two peaks as well as resins having more than two peaks.

The term "polyethylene formulation," as used herein, means any composition comprising a polyethylene polymer solely, or with additional components, such as an additional polymer.

"Polyethylene" or "ethylene-based polymer" means polymers comprising greater than 50% by mole of units derived from ethylene monomer. This includes ethylene-based homopolymers, interpolymers, or copolymers. Common forms of polyethylene known in the art include, but are not limited to, Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE). For example and not by way of limitation, the polyethylene polymer may comprise HDPE, wherein the HDPE is a polyethylene polymer with a density greater than 0.940 g/cm3.

The term "split" refers to the weight percent (wt %) of the high molecular weight ethylene polymer component in the bimodal formulation. Thus, it describes the relative amount of the high molecular weight component compared to the low molecular weight component in a bimodal polyethylene formulation, including any of the ethylene-based polymer formulations described herein. The weight percent of each component can also be represented by the area of each molecular weight distribution curve that is seen after deconvolution of the overall molecular weight distribution curve. In one or more embodiments the split of the bimodal polyethylene formulation can range from a low of 10 wt %, 25 wt %, 30 wt %, or 32 wt % to a high of 38 wt %, 43 wt %, or 45 wt %. In one or more embodiments, the split of the bimodal polyethylene formulation can range from 20 wt % to 45 wt %, or from 23 wt % to 43 wt %. In one or more embodiments, the split of the bimodal polyethylene formulation can range from 28 wt % to 43 wt %, 33 wt % to 43 wt %, or 34 wt % to 43 wt %. In one or more embodiments, the split of the bimodal polyethylene formulation can range from 21 wt % to 27 wt %, 21 wt % to 32 wt %, or 21 wt % to 37 wt %.

The molecular weight distribution may be measured by Size Exclusion Chromatography (SEC), e.g., GPC, among other techniques. As mentioned herein, the peak molecular weight (Mp(GPC)), the weight average molecular weight (Mw(GPC)), and the number average molecular weight (Mn(GPC)) are determined by using High Temperature Gel Permeation Chromatography (PolymerChar GPC-IR). The breadth of the molecular weight distribution (polydispersity) is expressed as the ratio of the weight average molecular weight to the number average molecular weight (Mw(GPC)/Mn(GPC)).

In one or more embodiments, the bimodal polyethylene formulation has an Mw(GPC) of from 150,000 g/mol to 600,000 g/mol. In one or more embodiments, the Mw(GPC) of the bimodal polyethylene formulation ranges from a low of 200,000 g/mol, 275,000 g/mol, 300,000 g/mol, 325,000 g/mol, or 350,000 g/mol to a high of 400,000 g/mol, 450,000 g/mol, 475,000 g/mol, or 500,000 g/mol. In one or more embodiments, the bimodal polyethylene formulation has an Mw(GPC) of from 150,000 g/mol to 600,000 g/mol, or from 200,000 g/mol to 400,000 g/mol, or from 325,000 g/mol to 575,000 g/mol, or from 350,000 g/mol to 500,000 g/mol, or from 385,000 g/mol to 500,000 g/mol.

In various embodiments, the bimodal polyethylene formulation has an Mz(GPC) of 1,500,000 g/mol or more. In one or more embodiments, the bimodal polyethylene formulation has an Mz(GPC) of 1,750,000 g/mol or more. In one or more embodiments, the bimodal polyethylene formulation has an Mz(GPC) ranging from 2,000,000 g/mol to 4,000,000 g/mol. In one or more embodiments, the bimodal polyethylene formulation has an Mz(GPC) between 1,800,000 g/mol and 4,000,000 g/mol. In one or more embodiments, the bimodal polyethylene formulation has an Mz(GPC) between 2,500,000 g/mol and 4,000,000 g/mol. In one or more embodiments, the bimodal polyethylene formulation has an Mz(GPC) that ranges from a low of U.S. Pat. Nos. 1,700,000, 1,850,000, 1,950,000, or 2,750,000 g/mol to a high of 3,000,000, 3,300,000, 3,500,000, or 4,000,000 g/mol.

In various embodiments, the bimodal polyethylene formulation has a peak molecular weight, Mp(GPC), of less than 50,000 g/mol, or less than 49,000 g/mol, or less than 48,000 g/mol. In one or more embodiments, the bimodal polyethylene formulation has an Mp(GPC) ranging from 25,000 g/mol to 50,000 g/mol, from 30,000 g/mol to 49,000 g/mol, or from 43,000 g/mol to 48,000 g/mol.

In various embodiments, the bimodal polyethylene formulation has a number average molecular weight, Mn(GPC), of less than 30,000 g/mol, or less than 27,000 g/mol, or less than 25,000 g/mol. In one or more embodiments, the bimodal polyethylene formulation has an Mn(GPC) ranging from 20,000 g/mol to 30,000 g/mol, from 21,000 g/mol to 27,000 g/mol, or from 22,000 g/mol to 25,000 g/mol.

In some particular embodiments, the bimodal polyethylene formulation has a peak molecular weight, Mp(GPC) of less than 50,000 g/mol, a number average molecular weight, Mn(GPC), of less than 30,000 g/mol, and a weight fraction (w1) of molecular weight (MW) less than 10,000 g/mol of less than or equal to 10.5 wt %, as shown in FIG. 1. In some such embodiments, the Mp(GPC) may be less than 49,000 g/mol. Additionally or alternatively, in some embodiments, the weight fraction (w1) of molecular weight (MW) less than 10,000 g/mol is less than or equal to 10.0 wt %, or less than or equal to 9.5 wt %, or less than or equal to 9.0 wt %. In some embodiments, the bimodal polyethylene formulation additionally has a weight fraction (w2) of molecular weight (MW) greater than 1,000,000 g/mol of greater than or equal to 9.0 wt %, as shown in FIG. 1. In some embodiments, the bimodal polyethylene formulation may have a weight fraction (w2) of molecular weight (MW) greater than 1,000,000 g/mol of greater than or equal to 10.0 wt %, or greater than or equal to 10.5 wt %. Moreover, the bimodal polyethylene formulation may have a weight fraction (w2) of molecular weight (MW) greater than 1,000,000 g/mol of from 9.0 wt % to 15.0 wt %, or from 10.0 wt % to 14.0 wt %.

According to some embodiments, the bimodal polyethylene can further be defined by the area proximate the Mp(GPC), as shown in FIG. 1. In particular, in some embodiments, the polyethylene formulation has a weight fraction (w3) of lg(MW) between lg(Mp(GPC))−0.25 and lg(Mp(GPC))+0.25 of from 29 wt % to 33 wt % or even from 30 wt % to 32 wt %, as shown in FIG. 1.

In accordance with one or more embodiments of the present disclosure, the multimodal HDPE formulation may have a density from 0.940 g/cm3 to 0.970 g/cm3 when measured according to ASTM D792. The multimodal HDPE formulation may have a density from 0.940 g/cm3 to 0.970 g/cm3, or from 0.940 g/cm3 to 0.965 g/cm3, or from 0.940 g/cm3 to 0.960 g/cm3, or from 0.940 g/cm3 to 0.955 g/cm3, or from 0.945 g/cm3 to 0.970 g/cm3, or from 0.945 g/cm3 to 0.965 g/cm3, or from 0.945 g/cm3 to 0.960 g/cm3, or from 0.945 g/cm3 to 0.955 g/cm3, or from 0.950 g/cm3 to 0.970 g/cm3, or from 0.950 g/cm3 to 0.965 g/cm3, or from 0.950 g/cm3 to 0.960 g/cm3, or from 0.950 g/cm3 to 0.955 g/cm3.

In some embodiments of the present disclosure, the multimodal HDPE may have a high load melt index (I21) from 1.0 g/10 minutes (min) to 10.0 g/10 min. when measured according to ASTM D1238 at 190° C. and a 21.6 kg load. The multimodal HDPE formulation may alternatively have an I21 from 1.0 g/10 minutes to 9.0 g/10 minutes, or from 1.0 g/10 minutes to 8.5 g/10 minutes, or from 1.0 g/10 minutes to 8.0 g/10 minutes, or from 1.0 g/10 minutes to 7.5 g/10 minutes. In other embodiments, the multimodal HDPE formulation may have an I21 from 2.0 g/10 minutes to 10.0 g/10 minutes, or from 3.0 g/10 minutes to 10.0 g/10 minutes, or from 4.0 g/10 minutes to 10.0 g/10 minutes, or from 5.0 g/10 minutes to 10.0 g/10 minutes. In some embodiments, the multimodal HDPE formulation may have an I21 from 3.0 g/10 minutes to 9.0 g/10 minutes, or from 3.0 g/10 minutes to 7.5 g/10 minutes, or from 4.0 g/10 minutes to 9.0 g/10 minutes, or from 4.0 g/10 minutes to 8.0 g/10 minutes or from 5.0 g/10 minutes to 7.5 g/10 minutes.

The term "Melt Flow Ratio", or MFR, as used herein means the ratio of melt indices. MFR (or I21/I5) is a ratio of I21 (also referred to as flow index or "FI") to I5 where I21 is measured by ASTM D1238 at 190° C. and a 21.6 kg load, as described above, and I5 is measured by ASTM D1238 at 190° C. and a 5.0 kg load. In one embodiment, the polyethylene formulation has a melt flow ratio (I21/I5) in the range from 15 to 35, or from 20 to 33, or from 28 to 32.

In various embodiments, the polyethylene formulation has a complex shear viscosity at 100 radians/second (rad/s) and 190° C. of less than or equal to 3,500 Pa*s. For example, the polyethylene formulation may have a complex shear viscosity at 100 rad/s and 190° C. of less than or equal to 3,250 Pa*s, less than or equal to 3,150 Pa*s, or less than or equal to 3,100 Pa*s. In some embodiments, the complex shear viscosity at 100 rad/s and 190° C. may range from 2,000 Pa*s to 3,500 Pa*s, from 2,250 Pa*s to 3,250 Pa*s, or from 2,500 Pa*s to 3,100 Pa*s. In various embodiments, the polyethylene formulation has a complex shear viscosity at 1 rad/s and 190° C. of greater than or equal to 45,000 Pa*s. For example, the polyethylene formulation may have a complex shear viscosity at 1 rad/s and 190° C. of greater than or equal to 47,500 Pa*s, greater than or equal to 50,000 Pa*s, or greater than or equal to 52,000 Pa*s. In some embodiments, the complex shear viscosity at 1 rad/s and 190° C. may range from 45,000 Pa*s to 80,000 Pa*s, from 47,500 Pa*s to 75,000 Pa*s, or from 50,000 Pa*s to 70,000 Pa*s.

Moreover, in various embodiments, the polyethylene formulation has a shear viscosity ratio of the complex shear viscosity at 1 rad/s to the complex shear viscosity at 100 rad/s of from 13 to 26, from 17 to 25, or from 18 to 24.

The environmental stress cracking resistance (ESCR) is a measure of the strength of the molded article in terms of its ability to resist failure by stress crack growth. A high ESCR value is important because the molded article should last through the designed application lifetime. The ESCR testing is performed in accordance with ASTM D1693, Procedure B. This is an accelerated test to determine the time to failure using 10% Igepal CO-630 nonionic surfactant solution at 50° C. The time to failure of 50% of the tested samples (F50 hours) is estimated from the measured values. The polyethylene formulation advantageously has an ESCR of at least 150 hours, or at least 200 hours, at least 300 hours, or at least 350 hours. The polyethylene formulation may have an ESCR ranging from 150 hours to 1,000 hours, or from 200 hours to greater than 750 hours, or from 300 hours to 700 hours, or from 350 hours to 600 hours.

The term "swell" as used herein refers to the enlargement of the cross-sectional dimensions, with respect to the die dimensions, of the ethylene-based polymer melt as it emerges from the die. This phenomenon, also known as the "Barus effect," is widely accepted to be a manifestation of the elastic nature of the melt as it recovers from the deformations it has experienced during its flow into and through the die. In the extrusion blow molding process, adequate polymer melt swell is required to fabricate articles of the targeted geometry and wall thickness distribution.

In various embodiments described herein, the polyethylene formulation provides improved ESCR while maintaining die swell. Accordingly, the polyethylene formulations can be manufactured without the need to replace or modify existing tooling and processing conditions.

As mentioned herein, "swell" is described in terms of Capillary, or Extrudate, or Die Swell. The swell of a polyethylene resin, produced by a catalyst system as disclosed herein, may be tailored during the polymerization process by judiciously selecting a hydrogen to ethylene ratio (H2/C2) to maintain, and adjusting the ratio of trim to main catalyst in order to produce a polymer with the desired melt flow rate (such as I5). For example, the swell of a polymer might be adjusted higher by employing a higher H2/C2 ratio and a lower trim/main catalyst ratio. This example should not be construed as limiting in any way; in other embodiments, the effects and relationships may be different.

To aid in tailoring the swell characteristics, a hydrogen to ethylene ratio range that may be used to produce a polyethylene resin having a desired flow index or desired molecular weight distribution using a catalyst system may be determined, and the desired ratio range may be different for each catalyst system. Swell characteristics of the resins over the hydrogen to ethylene ratio range may also be determined. In various embodiments, the polyethylene resin has a Capillary Swell t1000 (sec) of greater than or equal to 7.5 seconds, greater than or equal to 7.8 seconds, or greater than or equal to 8.0 seconds. For example, the polyethylene resin may have a Capillary Swell t1000 (sec) of from 7.5 to 10 seconds, from 7.8 to 9.5 seconds, or from 8.0 to 8.5 seconds.

In various embodiments, the catalyst systems as disclosed herein may allow for the production of polymers having bimodal resin distributions in a single reactor. In some embodiments, the reactor may be a gas phase reactor, although slurry phase reactors may also be employed. The catalyst system includes a main catalyst and a metallocene trim catalyst. As used herein, a "catalyst system" may include a main catalyst, a trim catalyst, and optionally, at least one activator. Catalyst systems may also include other components, for example, supports, and are not limited to the catalyst component and/or activator alone or in combination. The catalyst system may include any suitable number of catalyst components in any combination as described herein, as well as any activator. The catalyst system may also include one or more additives commonly used in the art of olefin polymerization. For example, the catalyst system may include one or more of the following: continuity additives, flow aids, and anti-static aids.

As described above, the catalyst system includes at least one main catalyst compound and may also include at least one catalyst for producing a high molecular weight fraction of the product by polymerization (sometimes referred to herein as an "HMW catalyst"), and at least one catalyst compound for producing a low molecular weight fraction of the product by polymerization (sometimes referred to herein as an "LMW catalyst"). Such catalyst systems comprising at least two catalyst compounds may produce bimodal polymer formulations.

The at least two catalyst compounds may have different hydrogen responses. By this it is meant that the change in average molecular weight of a polyethylene made by each of the catalyst compounds may be different when the H2/C2 ratio is changed. The term "high hydrogen response" may be used to define a catalyst that displays a relatively large change in the average molecular weight of polyethylene when the H2/C2 ratio is changed by a set amount. The term "low hydrogen response" may be used to define a catalyst that displays a relatively low change in average molecular weight of polyethylene when the H2/C2 ratio is changed by the same set amount.

The at least two catalyst compounds may have different comonomer responses. By this it is meant that the comonomer content, such as weight percent, of a polyethylene made by each of the catalyst compounds may be different. The term "good incorporator" may be used to define a catalyst that displays a relatively high degree of comonomer incorporation, while a "poor incorporator" enchains relatively less comonomer. For catalyst systems employing a relatively good incorporator HMW catalyst and a relatively poor incorporator LMW catalyst, a "reverse comonomer distribution" is produced with higher comonomer content in the HMW component. Conversely, a good incorporator LMW catalyst used with a poor incorporator HMW catalyst produces a "normal comonomer distribution" in the overall polymer composition.

The catalyst system may be referred to as a "bimodal catalyst system." That is, it produces a bimodal polyethylene having separate, identifiable high molecular weight and low molecular weight distributions. The term "bimodal catalyst system" includes any formulation, mixture, or system that includes at least two different catalyst compounds, each having the same or a different metal group, but generally different ligands or catalyst structure, including a "dual catalyst." Alternatively, each different catalyst compound of the bimodal catalyst system resides on a single support particle, in which case a dual catalyst is considered to be a supported catalyst. However, the term "bimodal catalyst system" also broadly includes a system or mixture in which one of the catalysts resides on one collection of support particles, and another catalyst resides on another collection of support particles. In such embodiments, the two supported catalysts are introduced to a single reactor, either simultaneously or sequentially, and polymerization is conducted in the presence of the two collections of supported catalysts. Alternatively, the bimodal catalyst system includes a mixture of unsupported catalysts in slurry form.

In various embodiments, the catalyst system includes a main catalyst and a trim catalyst. In such embodiments, the main catalyst system includes at least one catalyst compound (the "main catalyst compound") and a support, and may also contain an activator, and/or any other additives such as previously described. The main catalyst may be delivered as a slurry in a hydrocarbon diluent, such as mineral oil. The trim catalyst comprises a trim catalyst compound. This trim catalyst compound may also be present in the main catalyst system. The trim catalyst may also comprise a solvent, such as a hydrocarbon, and may also contain other additives. Using such a catalyst system, the ethylene-based polymer properties, such as the weight fraction of the high molecular weight component, can be controlled by adjusting the ratio of the trim catalyst to the main catalyst system that is employed in the polymerization reaction.

The trim catalyst compound may be a molecular catalyst compound, such as, for example, a metallocene catalyst compound. In one embodiment of the invention, the trim catalyst is employed for producing a low molecular weight polymer fraction. In one embodiment of the invention, the main catalyst is employed for producing a high molecular weight polymer fraction.

The main catalyst compound may include one or more Group 15 and metal containing catalyst compounds. The Group 15 and metal containing compound generally includes a Group 3 to 14 metal atom, or a Group 3 to 7, or a Group 4 to 6, or a Group 4 metal atom bound to at least one leaving group and also bound to at least two Group 15 atoms, at least one of which is also bound to a Group 15 or 16 atom through another group.

At least one of the Group 15 atoms may be bound to a Group 15 or 16 atom through another group which may be a C1 to C20 hydrocarbon group, a heteroatom containing group, silicon, germanium, tin, lead, or phosphorus, wherein the Group 15 or 16 atom may also be bound to nothing or a hydrogen, a Group 14 atom containing group, a halogen, or a heteroatom containing group, and wherein each of the two Group 15 atoms are also bound to a cyclic group and may optionally be bound to hydrogen, a halogen, a heteroatom or a hydrocarbyl group, or a heteroatom containing group.

The Group 15 and metal containing compound is represented by the formulae:

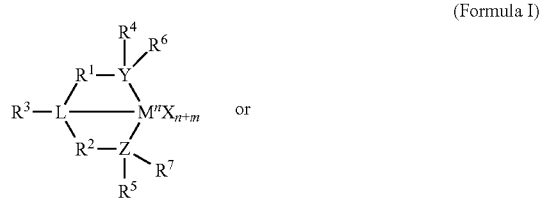

(Formula I)

(Formula II)

wherein M is a Group 3 to 12 transition metal or a Group 13 or 14 main group metal, or a Group 4, 5, or 6 metal, or a Group 4 metal, or zirconium, titanium or hafnium, and each X is independently a leaving group. X may be an anionic leaving group. X may be hydrogen, a hydrocarbyl group, a heteroatom or a halogen. X may be an alkyl, y may be 0 or 1 (when y is 0 group L' is absent), n is the oxidation state of M, which may be +3, +4, or +5, or may be +4, m is the formal charge of the YZL or the YZL' ligand, which may be 0, −1, −2 or −3, or may be −2, L is a Group 15 or 16 element, preferably nitrogen, L' is a Group 15 or 16 element or Group 14 containing group, preferably carbon, silicon or germanium, Y is a Group 15 element, preferably nitrogen or phosphorus, and more preferably nitrogen, Z is a Group 15 element, preferably nitrogen or phosphorus, and more preferably nitrogen, R1 and R2 are independently a C1 to C20 hydrocarbon group, a heteroatom containing group having up to twenty carbon atoms, silicon, germanium, tin, lead, halogen or phosphorus, preferably a C2 to C20 alkyl, aryl or aralkyl group, more preferably a linear, branched or cyclic C2 to C20 alkyl group, most preferably a C2 to C6 hydrocarbon group. R1 and R2 may also be interconnected to each other, R3 is absent or a hydrocarbon group, hydrogen, a halogen, a heteroatom containing group, preferably a linear, cyclic or branched alkyl group having 1 to 20 carbon atoms, more preferably R3 is absent, hydrogen or an alkyl group, and most preferably hydrogen, R4 and R5 are independently an alkyl group, an aryl group, substituted aryl group, a cyclic alkyl group, a substituted cyclic alkyl group, a cyclic aralkyl group, a substituted cyclic aralkyl group or multiple ring system, preferably having up to 20 carbon atoms, more preferably between 3 and 10 carbon atoms, and even more preferably a C1 to C20 hydrocarbon group, a C1 to C20 aryl group or a C1 to C20 aralkyl group, or a heteroatom-containing group, for example PR3 where R is an alkyl group, R1 and R2 may be interconnected to each other, and/or R4 and R5 may be interconnected to each other, R6 and R7 are independently absent, or hydrogen, an alkyl group, halogen, heteroatom or a hydrocarbyl group, preferably a linear, cyclic or branched alkyl group having 1 to 20 carbon atoms, more preferably absent, and *R is absent, or is hydrogen, a Group 14 atom containing group, a halogen, or a heteroatom containing group.

By "formal charge of the YZL or YZL' ligand," it is meant the charge of the entire ligand absent the metal and the leaving groups X.

By "R1 and R2 may also be interconnected," it is meant that R1 and R2 may be directly bound to each other or may be bound to each other through other groups. By "R4 and R5 may also be interconnected," it is meant that R4 and R5 may be directly bound to each other or may be bound to each other through other groups.

Alkyl groups may be linear or branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, aroylamino radicals, straight, branched or cyclic, alkylene radicals, or combination thereof. An aralkyl group is defined to be a substituted aryl group.

R4 and R5 may be independently a group represented by the following Formula III:

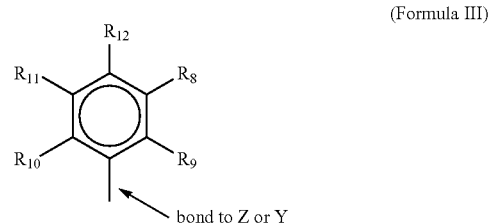

(Formula III)

wherein R8 to R12 are each independently hydrogen, a C1 to C40 alkyl group, a halide, a heteroatom, a heteroatom containing group containing up to 40 carbon atoms, preferably a C1 to C20 linear or branched alkyl group, preferably a methyl, ethyl, propyl or butyl group, any two R groups may form a cyclic group and/or a heterocyclic group. The cyclic groups may be aromatic. R9, R10, and R12 may be independently a methyl, ethyl, propyl or butyl group (including all isomers). In a preferred embodiment any 3 of the R groups of formula III may be methyl groups, and any 2 of the other R groups of formula III may be hydrogen. In a preferred embodiment of the invention, R9, R10, and R12 are methyl, and R8 and R11 are hydrogen.

R4 and R5 may be both a group represented by the following Formula IV:

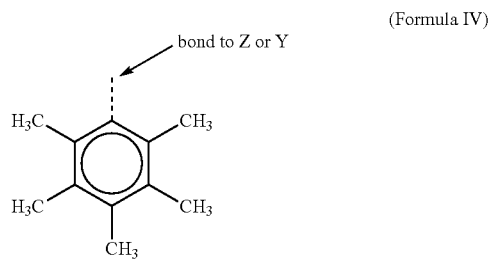

(Formula IV)

where M is a Group 4 metal, preferably zirconium, titanium or hafnium, and even more preferably zirconium; each of L, Y, and Z is nitrogen; each of R1 and R2 is —CH2-CH2-; R3 is hydrogen; and R6 and R7 are absent.

The Group 15 and metal containing compound may be Compound 1 (also referred to as "bis(arylamido)Zr dibenzyl") represented below:

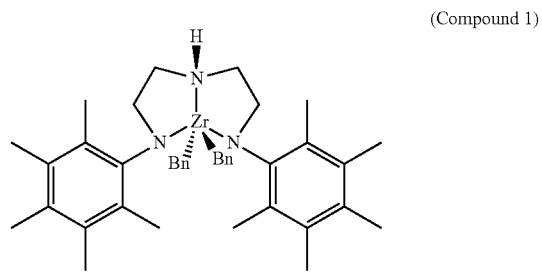

(Compound 1)

In the representation of Compound 1, "Bn" denotes a benzyl group.

Group 15 and metal containing catalyst compounds may be made by methods known in the art. In some cases, the methods disclosed in EP 0 893 454 A1, U.S. Pat. No. 5,889,128 and the references cited in U.S. Pat. No. 5,889,128 are suitable.

In some embodiments, direct synthesis of these compounds includes reacting the neutral ligand, (for example YZL or YZL' of formula I or II) with MnXn (M is a Group 3 to 14 metal, n is the oxidation state of M, each X is an anionic group, such as halide), in a non-coordinating or weakly coordinating solvent (such as ether, toluene, xylene, benzene, methylene chloride, and/or hexane or other solvent having a boiling point above 60° C.), at 20 to 150° C. (such as 20 to 100° C.), for 24 hours or more, then treating the mixture with an excess (such as four or more equivalents) of an alkylating agent, such as methyl magnesium bromide in ether. The magnesium salts are removed by filtration, and the metal complex isolated by standard techniques.

The Group 15 and metal containing compound may be made by a method comprising reacting a neutral ligand (for example YZL or YZL' of formula I or II) with a compound represented by the formula MnXn (where M is a Group 3 to 14 metal, n is the oxidation state of M, each X is an anionic leaving group) in a non-coordinating or weakly coordinating solvent, at 20° C. or above (preferably at 20 to 100° C.), then treating the mixture with an excess of an alkylating agent, then recovering the metal complex. The solvent may have a boiling point above 60° C., such as toluene, xylene, benzene, and/or hexane. The solvent may comprise ether and/or methylene chloride.

Generally, metallocene compounds may include half and full sandwich compounds having one or more ligands bonded to at least one metal atom. Typical metallocene compounds are generally described as containing one or more ligand(s) and one or more leaving group(s) bonded to at least one metal atom.

The ligands are generally represented by one or more open, acyclic, or fused ring(s) or ring system(s) or a combination thereof. These ligands, preferably the ring(s) or ring system(s) may be composed of atoms selected from Groups 13 to 16 atoms of the Periodic Table of Elements. The atoms may be selected from the group consisting of carbon, nitrogen, oxygen, silicon, sulfur, phosphorous, germanium, boron and aluminum or a combination thereof. The ring(s) or ring system(s) may be composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom may be selected from Groups 3 through 15 and the lanthanide or actinide series of the Periodic Table of Elements. The metal may be a transition metal from Groups 4 through 12, or Groups 4, 5 and 6, or the transition metal is from Group 4.

The catalyst composition may include one or more metallocene catalyst compounds represented by the Formula V:

  (Formula V)

where M is a metal atom from the Periodic Table of the Elements and may be a Group 3 to 12 metal or from the lanthanide or actinide series of the Periodic Table of Elements. M may be a Group 4, 5 or 6 transition metal, or M is a Group 4 transition metal, or M is zirconium, hafnium or titanium. The ligands, LA and LB, may be open, acyclic or fused ring(s) or ring system(s) and may be any ancillary ligand system, including unsubstituted or substituted, cyclopentadienyl ligands or cyclopentadienyl-type ligands, heteroatom substituted and/or heteroatom containing cyclopentadienyl-type ligands. Non-limiting examples of ligands include cyclopentadienyl ligands, cyclopenta-phenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. LA and LB may be any other ligand structure capable of π-bonding to M. The atomic molecular weight of LA and LB may exceed 60 a.m.u., or may exceed 65 a.m.u. LA and LB may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other LA and LB ligands include but are not limited to amides, phosphides, alkoxides, aryloxides, imides, carbolides, borollides, porphyrins, phthalocyanines, corrins and other polyazomacrocycles. Independently, each LA and LB may be the same or different type of ligand that is bonded to M. In one alternative of Formula V only one of either LA and LB may be present.

Independently, each LA and LB may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that may also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluoroethyl, difluoroethyl, iodopropyl, bromohexyl, chlorobenzyl and hydrocarbyl substituted organometallic radicals including trimethylsilyl, trimethylgermyl, methyldiethylsilyl and the like; and halocarbyl-substituted organometalloid radicals including tris(trifluoromethyl)-silyl, methyl-bis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R may form a carbon sigma bond to the metal M.

Other ligands may be bonded to the metal M, such as at least one leaving group Q. Q may be a monoanionic labile ligand having a sigma-bond to M. Depending on the oxidation state of the metal, the value for n may be 0, 1 or 2 such that Formula V above represents a neutral metallocene catalyst compound.

Non-limiting examples of Q ligands may include weak bases such as amines, phosphines, ethers, carboxylates, dienes, hydrocarbyl radicals having from 1 to 20 carbon atoms, hydrides or halogens and the like or a combination thereof. Two or more Q's may form a part of a fused ring or ring system. Other examples of Q ligands include those substituents for R as described above and including cyclobutyl, cyclohexyl, heptyl, tolyl, trifluoromethyl, tetramethylene, pentamethylene, methylidene, methoxy, ethoxy, propoxy, phenoxy, bis(N-methylanilide), dimethylamide, dimethylphosphide radicals and the like.

The catalyst composition may include one or more metallocene catalyst compounds where LA and LB of Formula V are bridged to each other by at least one bridging group, A, as represented by Formula VI:

$$L^A A L^B M Q_n \qquad \text{(Formula VI)}$$

The compounds of Formula VI are known as bridged, metallocene catalyst compounds. LA, LB, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Bridging group A may contain a carbon, silicon or germanium atom, preferably A contains at least one silicon atom or at least one carbon atom. The bridging group A may also contain substituent groups R as defined above including halogens and iron. Non-limiting examples of bridging group A may be represented by R'2C, R'2Si, R'2Si R'2Si, R'2Ge, R'P, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. The bridged, metallocene catalyst compounds of Formula IV may have two or more bridging groups A (EP 0 664 301 B1).

The metallocene catalyst compounds may be those where the R substituents on the ligands LA and LB of Formulas V and VI are substituted with the same or different number of substituents on each of the ligands. The ligands LA and LB of Formulas V and VI may be different from each other.

The main catalyst system includes a main catalyst compound represented by Formula II above, such as a compound having the formula [(2,3,4,5,6-Me5C6)NCH2CH2]2NHZrBn2, where 2,3,4,5,6-Me5C6 represents a pentamethylphenyl group, and Bn is a benzyl group. Optionally, the main catalyst system may include a second main catalyst compound that may be represented by Formula V above, such as a zirconocene compound, such as (n-butylcyclopentadienyl)2zirconium(IV) dichloride or (propylcyclopentadienyl)(1,3-dimethyl-4,5,6,7-tetrahydroindenyl)zirconium (IV) dimethyl.

The molar ratio of the HMW catalyst compound to the LMW catalyst compound in the catalyst formulation may be in the range from 1:20 to 20:1, or from 1:10 to 10:1, or from 1:5 to 5:1, or from 1:1 to 5:1, or from 1:1 to 3:1.

The trim catalyst may comprise a catalyst compound that may be represented by Formula VII below; specifically, Formula VII shows (cyclopentadienyl)(1,3-dimethyl-4,5,6,7-tetrahydroindenyl)zirconium dimethyl:

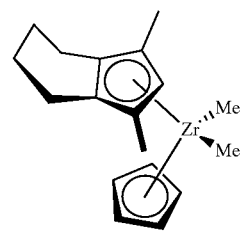

(Formula VII)

As used herein, the term "activator" may include any combination of reagents that increases the rate at which a transition metal compound oligomerizes or polymerizes unsaturated monomers, such as olefins. An activator may also affect the molecular weight, degree of branching, comonomer content, or other properties of the oligomer or polymer. The transition metal compounds may be activated for oligomerization and/or polymerization catalysis in any manner sufficient to allow coordination or cationic oligomerization and or polymerization.

Alumoxane activators may be utilized as an activator for one or more of the catalyst compositions. Alumoxane(s) or aluminoxane(s) are generally oligomeric compounds containing —Al(R)—O— subunits, where R is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide. Mixtures of different alumoxanes and modified alumoxanes may also be used. For further descriptions, see U.S. Pat. Nos. 4,665,208; 4,952,540; 5,041,584; 5,091,352; 5,206,199; 5,204,419; 4,874,734; 4,924,018; 4,908,463; 4,968,827; 5,329,032; 5,248,801; 5,235,081; 5,157,137; 5,103,031; and EP 0 561 476; EP 0 279 586; EP 0 516 476; EP 0 594 218; and WO 94/10180.

When the activator is an alumoxane (modified or unmodified), the maximum amount of activator may be selected to be a 5000-fold molar excess Al/M over the catalyst precursor (per metal catalytic site). Alternatively or additionally the minimum amount of activator-to-catalyst-precursor may be set at a 1:1 molar ratio.

Aluminum alkyl or organoaluminum compounds that may be utilized as activators (or scavengers) include trimethylaluminum, triethylaluminum, triisobutylaluminum, tri-n-hexylaluminum, tri-n-octylaluminum and the like.

The catalyst systems may include a support material or carrier. For example, the at least one or more catalyst compounds and/or one or more activators may be deposited on, contacted with, vaporized with, bonded to, or incorporated within, adsorbed or absorbed in, or on, one or more supports or carriers. Thus, the above described catalyst compounds as well as other transition metal catalyst compounds and/or catalyst systems may be combined with one or more support materials or carriers using one of the support methods well known in the art or as described below. For example, a metallocene catalyst compound or catalyst system is in a supported form, for example, when deposited on, contacted with, or incorporated within, adsorbed or absorbed in, or on, a support or carrier.

As used herein, the terms "support" and "carrier" are used interchangeably and are any support material, including a porous support material, for example, talc, inorganic oxides, and inorganic chlorides. Other carriers include resinous support materials such as polystyrene, functionalized or crosslinked organic supports, such as polystyrene divinyl benzene polyolefins or other polymeric compounds, zeolites, clays or any other organic or inorganic support material and the like, or mixtures thereof.

Illustrative support materials such as inorganic oxides include Group 2, 3, 4, 5, 13 or 14 metal oxides. The preferred supports include silica, which may or may not be dehydrated, fumed silica, alumina (see, for example, WO 99/60033), silica-alumina and mixtures thereof. Other useful supports include magnesia, titania, zirconia, magnesium chloride (U.S. Pat. No. 5,965,477), montmorillonite (EP 0 511 665), phyllosilicate, zeolites, talc, clays (U.S. Pat. No. 6,034,187), and the like. Also, combinations of these support materials may be used, for example, silica-chromium, silica-alumina, silica-titania and the like. Additional support materials may include those porous acrylic polymers described in EP 0 767 184, which is incorporated herein by reference. Other support materials include nanocomposites as disclosed in WO 99/47598; aerogels as disclosed in WO 99/48605; spherulites as disclosed in U.S. Pat. No. 5,972,510; and polymeric beads as disclosed in WO 99/50311.

In some embodiments, all catalyst compounds of the catalyst system independently may be unsupported, alternatively supported on a support material, in which latter case the catalyst system is a supported catalyst system. When each catalyst compound is supported, the catalyst compounds may reside on the same support material (e.g., same particles), or on different support materials (e.g., different particles). The bimodal catalyst system includes mixtures of unsupported catalyst compounds in slurry form and/or solution form. The support material may be a silica (e.g., fumed silica), alumina, a clay, or talc. The fumed silica may be hydrophilic (untreated), alternatively hydrophobic (treated). In some aspects the support is the hydrophobic fumed silica, which may be prepared by treating an untreated fumed silica with a treating agent such as dimethyldichlorosilane, a polydimethylsiloxane fluid, or hexamethyldisilazane. In some aspects the treating agent is dimethyldichlorosilane.

In some embodiments, the support material, such as an inorganic oxide, may have a surface area in the range of from 10 m2/g to 700 m2/g, pore volume in the range of from 0.1 cm3/g to 4.0 cm3/g and average particle size in the range of from 5 microns to 500 microns. More preferably, the surface area of the support material may be in the range from 50 m2/g to 500 m2/g, pore volume from 0.5 cm3/g to 3.5 cm3/g and average particle size of from 10 microns to 200 microns. Most preferably the surface area of the support material may be in the range is from 100 m2/g to 400 m2/g, pore volume from 0.8 cm3/g to 3.0 cm3/g and average particle size is from 5 microns to 100 microns. The average pore size of the carrier typically has pore size in the range of from 10 Angstroms to 1,000 Angstroms, alternatively from 50 Angstroms to 500 Angstroms, and in some embodiments from 75 Angstroms to 350 Angstroms. There are various other methods in the art for supporting a polymerization catalyst compound or catalyst system. For example, the metallocene catalyst compounds may contain a polymer bound ligand as described in, for example, U.S. Pat. Nos. 5,473,202 and 5,770,755. The metallocene catalyst compounds may be spray dried as described in, for example, U.S. Pat. No. 5,648,310. The support used with the metallocene catalyst compounds may be functionalized, as described in EP 0 802 203, or at least one substituent or leaving group is selected as described in U.S. Pat. No. 5,688,880.

The polyethylene formulations disclosed herein may be made by gas phase processes. The formulations may be made in a single reactor. The polyethylene formulations disclosed herein may also be made in a single gas phase reactor. In one embodiment of the invention, the reactor is a gas phase fluidized bed polymerization reactor.

The polyethylene may be produced using a staged gas phase reactor. Commercial polymerization systems are described in, for example, "Volume 2, Metallocene-Based Polyolefins," at pages 366-378 (John Scheirs & W. Kaminsky, eds. John Wiley & Sons, Ltd. 2000); U.S. Pat. Nos. 5,665,818; 5,677,375; and 6,472,484; and EP 0 517 868 and EP 0 794 200.

Gas phase processes may utilize a fluidized bed reactor. A fluidized bed reactor may include a reaction zone and a so-called velocity reduction zone. The reaction zone may include a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream may be at a rate equal to the rate at which particulate polymer product and monomer associated therewith may be withdrawn from the reactor and the composition of the gas passing through the reactor may be adjusted to maintain an essentially steady state gaseous composition within the reaction zone. The gas leaving the reaction zone may be passed to the velocity reduction zone where entrained particles are removed. Finer entrained particles and dust may be removed in a cyclone and/or fine filter. The gas may be passed through a heat exchanger where the heat of polymerization may be removed, compressed in a compressor, and then returned to the reaction zone. Additional reactor details and means for operating the reactor are described in, for example, U.S. Pat. Nos. 3,709,853; 4,003,712; 4,011,382; 4,302,566; 4,543,399; 4,882,400; 5,352,749; and 5,541,270; EP 0802202; and Belgian Patent No. 839,380.

The reactor temperature of the fluidized bed process may range from 30° C. or 40° C. or 50° C. to 90° C. or 100° C. or 110° C. or 120° C. or 150° C. In general, the reactor temperature may be operated at the highest temperature feasible taking into account the sintering temperature of the ethylene-based polymer product within the reactor. Regardless of the process used to make the polyolefins, e.g., bimodal polyethylene, the polymerization temperature or reaction temperature should be below the melting or "sintering" temperature of the ethylene-based polymer to be formed. Thus, the upper temperature limit may be the melting temperature of the polyolefin produced in the reactor.

Hydrogen gas may be used in olefin polymerization to control the final properties of the polyolefin, such as described in "Polypropylene Handbook," at pages 76-78 (Hanser Publishers, 1996). The amount of hydrogen in the polymerization may be expressed as a mole ratio relative to the total polymerizable monomer, for example, ethylene, or a blend of ethylene and 1-hexene or propylene. The amount of hydrogen used in the polymerization process may be an amount necessary to achieve the desired MFR or FI of the final polyolefin resin. The amount of hydrogen used in the polymerization process may also be an amount necessary to achieve a desired bimodal molecular weight distribution between the high molecular weight component and the low molecular weight component of a bimodal polyolefin.

The catalyst system may also be used to further control the properties of the polyethylene formulation. For example, the amount of trim catalyst may be adjusted to modify the in-reactor ratio of the catalyst compounds of the catalyst system so as to achieve a desired flow index or flow index split. The trim catalyst may be fed directly to the reactor separately from the main catalyst compound of the catalyst system. The trim catalyst may also be mixed with the main catalyst compound of the catalyst system prior to feeding to the reactor. The trim catalyst may also be continuously mixed with the other compounds of the catalyst system and the resulting mixture continuously fed to the reactor. The trim catalyst may be continuously mixed with a supported catalyst and the resulting mixture continuously fed to the reactor. The trim catalyst may be a supported catalyst or an unsupported catalyst. Where the trim catalyst is an unsupported catalyst it may be supported 'in-line' for example by contacting with a supported catalyst prior to feeding to the reactor. The supported trim catalyst may comprise an activator that may activate the trim catalyst 'in-line' prior to feeding to the reactor.

The trim catalyst may be provided in a form that is the same or different to that of the main catalyst compound (or one of the main catalyst compounds) of the catalyst system. However, upon activation by a suitable activator the active catalyst species resulting from the trim catalyst may be the same as the active catalyst species resulting from one of the at least two different catalyst compounds of the catalyst. The skilled person would appreciate that, for example, a metallocene dihalide and a metallocene dialkyl may yield the same active catalyst species upon treatment with a suitable activator. For example, a metallocene such as (cyclopentadienyl)(1,3-dimethyl-4,5,6,7-tetrahydroindenyl)zirconium (X)2 (where X can be a halide, alkyl, or any other leaving group as previously described) may be used in the dichloride form to make a supported catalyst. When used as a trim catalyst it may be provided in the dialkyl form such as the dimethyl form. This may be advantageous in regard to solubility where dialkyl forms may have enhanced solubility in, for example, aliphatic hydrocarbons.

The catalyst system may comprise at least one, or two or more, catalyst compound(s) comprising a titanium, a zirconium, or a hafnium atom. The catalyst system may comprise at least one, or two or more, of the following:

(pentamethylcyclopentadienyl)(n-propylcyclopentadienyl)MX2;
(tetramethylcyclopentadienyl)(n-propylcyclopentadienyl)MX2;
(tetramethylcyclopentadienyl)(n-butylcyclopentadienyl)MX2;
(n-propylcyclopentadienyl)(1,3-dimethyl-4,5,6,7-tetrahydroindenyl)MX2;
(methylcyclopentadienyl)(1,3-dimethyl-4,5,6,7-tetrahydroindenyl)MX2;
(cyclopentadienyl)(1,3-dimethyl-4,5,6,7-tetrahydroindenyl)MX2;
(methylcyclopentadienyl)(1-methyl-4,5,6,7-tetrahydroindenyl)MX2;
Me2Si(indenyl)2MX2;
Me2Si(4,5,6,7-tetrahydroindenyl)2MX2;
(n-propyl cyclopentadienyl)2MX2;
(n-butyl cyclopentadienyl)2MX2;
(1-methyl, 3-butyl cyclopentadienyl)2MX2;
[HN(CH2CH2N(2,4,6-Me3C6H2))2]MX2;
[HN(CH2CH2N(2,3,4,5,6-Me5C6))2]MX2;

and mixtures thereof, wherein M is Zr or Hf, and X is selected from F, Cl, Br, I, Me, benzyl, CH2SiMe3, and C1 to C5 alkyls or alkenyls.

The mole ratio of hydrogen to total monomer (H2:monomer) may be in a range from greater than 0.0001, greater than 0.0005, or greater than 0.001, and less than 10, less than 5, less than 3, or less than 0.10, wherein a desirable range may include any combination of any upper mole ratio limit with any lower mole ratio limit described herein. Expressed another way, the amount of hydrogen in the reactor at any time may range up to 5,000 ppm, up to 4,000 ppm, or up to 3,000 ppm, or between 50 ppm and 5,000 ppm, or between 500 ppm and 2,000 ppm.

The one or more reactor pressures in a gas phase process (either single stage or two or more stages) may vary from 690 kPa (100 psig) to 3,448 kPa (500 psig). For example, they may range from 1,379 kPa (200 psig) to 2,759 kPa (400 psig) or from 1,724 kPa (250 psig) to 2,414 kPa (350 psig).

The catalyst system may be used to produce a bimodal polyethylene formulation having a flow index, I21, in the range from 1 to 10 g/10 min and a density of greater than or equal to 0.940 g/cc. When used to produce such a bimodal polyethylene formulation in a gas phase reactor, the reactor conditions may include a temperature in the range from 65° C. to 120° C., on a molar basis.

The polyethylene formulations may be used in a wide variety of products and end-use applications. The polyethylene formulations may also be blended and/or coextruded with any other polymer. Non-limiting examples of other polymers include linear low density polyethylenes, elastomers, plastomers, high pressure low density polyethylene, high density polyethylenes, polypropylenes and the like. The formulations described herein may be used to produce blow molded components or products, among other various end uses. The polyethylene formulations and blends thereof may be useful in forming operations such as film, sheet, and fiber extrusion and co-extrusion as well as blow molding, injection molding and rotary molding. Films may include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers may include melt spinning, solution spinning and melt blown fiber operations for use in woven or non-woven form to make filters, diaper fabrics, medical garments, geotextiles, etc. Extruded articles may include medical tubing, wire and cable coatings, pipe, geomembranes, and pond liners. Molded articles may include single and multi-layered constructions in the form of bottles, tanks, large hollow articles, rigid food containers and toys, etc.

In one or more embodiments, the article may have advantageous or desirable properties. For instance, the article may, among other things, provide improved ESCR and proper die swell.

Molecular Weight Determination by GPC

The chromatographic system consisted of a PolymerChar GPC-IR (Valencia, Spain) high temperature GPC chromatograph equipped with an internal IR5 infra-red detector (IR5). The autosampler oven compartment was set at 160° C. and the column compartment was set at 150° C. The columns used were 4 Agilent "Mixed A" 30 cm 20-micron linear mixed-bed. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with at least 20 narrow molecular weight distribution polystyrene standards with molecular weights ranging from 580 to 8,400,000 g/mol and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000 g/mol, and 0.05 grams in 50 milliliters of solvent for molecular weights less than 1,000,000 g/mol. The polystyrene standards were dissolved at 80° C. with gentle agitation for 30 minutes. The polystyrene standard peak molecular weights were converted to ethylene-based polymer molecular weights using Equation 1 (as described in Williams and Ward, J. Polym. Sci., Polym. Let., 6, 621 (1968)).

$$M_{polyethylene} = A \times (M_{polystyrene})^B \quad \text{(Equation 1)}$$

where M is the molecular weight, A has a value of 0.4315 and B is equal to 1.0.

A fifth order polynomial was used to fit the respective ethylene-based polymer—equivalent calibration points. A small adjustment to A (from approximately 0.39 to 0.44) was made to correct for column resolution and band-broadening effects such that NIST standard NBS 1475 is obtained at a molecular weight of 52,000 g/mol.

The total plate count of the GPC column set was performed with Eicosane (prepared at 0.04 g in 50 milliliters of TCB and dissolved for 20 minutes with gentle agitation). The plate count (Equation 2) and symmetry (Equation 3) were measured on a 200 microliter injection according to the following equations:

$$\text{Plate Count} = 5.54 \times \left( \frac{RV_{Peak\,Max}}{\text{Peak Width at half height}} \right)^2 \quad \text{(Equation 2)}$$

where RV is the retention volume in milliliters, the peak width is in milliliters, the peak max is the maximum height of the peak, and half height is one half of the height of the peak maximum.

$$\text{Symmetry} = \frac{(\text{Rear Peak } RV_{one\,tenth\,height} - RV_{Peak\,max})}{(RV_{Peak\,max} - \text{Front Peak } RV_{one\,tenth\,height})} \quad \text{(Equation 3)}$$

where RV is the retention volume in milliliters and the peak width is in milliliters, Peak max is the maximum position of the peak, one tenth height is one tenth of the height of the peak maximum, and where rear peak refers to the peak tail at later retention volumes than the peak max and where front peak refers to the peak front at earlier retention volumes than the peak max. The plate count for the chromatographic system should be greater than 22,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 3 hours at 160° C. under "low speed" shaking.

The calculations of Mn(GPC), Mw(GPC), and Mz(GPC) were based on GPC results using the internal IR5 detector (measurement channel) of the PolymerChar GPC-IR chromatograph according to Equations 4-7, using PolymerChar GPCOne™ software, the baseline-subtracted IR chromatogram at each equally-spaced data collection point i (IRi) and the ethylene-based polymer equivalent molecular weight obtained from the narrow standard calibration curve for the point i (Mpolyethylene,i in g/mol) from Equation 1. Subsequently, a GPC molecular weight distribution (GPC-MWD) plot (wtGPC(lgMW) vs. lgMW plot, where wtGPC(lgMW) is the weight fraction of ethylene-based polymer molecules with a molecular weight of lgMW) for the ethylene-based polymer sample can be obtained. Molecular weight (MW) is in g/mol and wtGPC(lgMW) follows the Equation 4.

$$\int wt_{GPC}(lgMW) d lgMW = 1.00 \quad \text{(Equation 4)}$$

Number-average molecular weight Mn(GPC), weight-average molecular weight Mw(GPC) and z-average molecular weight Mz(GPC) can be calculated by the following equations.

$$Mn(GPC) = \frac{\sum_i IR_i}{\sum_i (IR_i / M_{polyethylene,i})} \quad \text{(Equation 5)}$$

$$Mw(GPC) = \frac{\sum_i (IR_i * M_{polyethylene,i})}{\sum_i IR_i} \quad \text{(Equation 6)}$$

$$Mz(GPC) = \frac{\sum_i (IR_i * M_{polyethylene,i}^2)}{\sum_i (IR_i * M_{polyethylene,i})} \quad \text{(Equation 7)}$$

Peak molecular weight Mp(GPC) is the molecular weight at which the wtGPC(lgMW) has the highest value on the GPC-MWD plot.

As shown in FIG. 1, the weight fraction (w1) of molecular weight (MW) less than 10,000 g/mol can be defined as the area under the GPC-MWD curve from lgMW=1 to lgMW=4; the weight fraction (w2) of molecular weight (MW) greater than 1,000,000 g/mol can be defined as the area under the GPC-MWD curve from lgMW=6 to lgMW=9; and the weight fraction (w3) of lg(MW) between lg(Mp(GPC))−0.25 and lg(Mp(GPC))+0.25 can be defined as the area under the GPC-MWD curve from lgMW=lg(Mp (GPC))−0.25 to lgMW=lg(Mp(GPC))+0.25. They can be calculated using the following equations:

$$w1 = \int_1^4 wt_{GPC}(lgMW) d lgMW \quad \text{(Equation 8)}$$

$$w2 = \int_6^9 wt_{GPC}(lgMW) d lgMW \quad \text{(Equation 9)}$$

$$w3 = \int_{lg(Mp(GPC))-0.25}^{lg(Mp(GPC))+0.25} wt_{GPC}(lgMW) d lgMW \quad \text{(Equation 10)}$$

The weight average molecular weight of a particular polyethylene component recited in the claims, e.g., the HMW component and the LMW component, can also be determined by any published method, including those mentioned in the paragraphs above; however, a preferred method is using any published deconvolution procedure, e.g., any published technique for elucidating each individual component polymer's molecular information in a bimodal polymer. A particularly preferred technique is one that uses a Flory deconvolution, including but not limited to the Flory procedures set forth in U.S. Pat. No. 6,534,604 which is incorporated by reference in its entirety.

The GPC of Examples 1 to 3 underwent deconvolution using seven Schulz-Flory distributions and assigning the lowest three to the LMW portion and the four highest to the HMW fraction. The GPC of Comparative Example 6 underwent deconvolution using nine Schulz-Flory distributions and assigning the lowest five to the LMW portion and the four highest to the HMW fraction. The GPC of Comparative Example 9 underwent deconvolution using seven Schulz-Flory distributions and assigning the lowest four to the LMW portion and the three highest to the HMW fraction. The results are shown in Table 4, below.

In order to monitor the deviations over time, a flow rate marker (decane) was introduced into each sample via a micropump controlled with the PolymerChar GPC-IR system. This flow rate marker (FM) was used to linearly correct the pump flow rate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flow rate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flow rate (with respect to the narrow standards calibration) is calculated as Equation 11. Processing of the flow marker peak was done via the PolymerChar GPCOne™ Software. Acceptable flow rate correction is such that the effective flowrate should be within 0.5% of the nominal flowrate.

$$\text{Flow rate}_{\textit{effective}} = \text{Flow rate}_{\textit{nominal}} \times (RV(FM_{\textit{calibrated}})/RV(FM_{\textit{Sample}}))$$ (Equation 11)

IR5 GPC Comonomer Content (GPC-CC) Plot

A calibration for the IR5 detector rationing was performed using at least ten ethylene-based polymer standards (ethylene-based polymer homopolymer and ethylene/octene copolymers) of known short chain branching (SCB) frequency (The comonomer content of the reference materials is determined using 13C NMR analysis in accordance with techniques described, for example, in U.S. Pat. No. 5,292,845 (Kawasaki, et al.) and by J. C. Randall in Rev. Macromol. Chem. Phys., C29, 201-317, which are incorporated herein by reference), ranging from homopolymer (0 SCB/1000 total C) to approximately 50 SCB/1000 total C, where total C is equal to the carbons in backbone plus the carbons in branches. Each standard had a weight-average molecular weight from 36,000 g/mole to 126,000 g/mole and had a molecular weight distribution from 2.0 to 2.5, as determined by GPC. Typical Copolymer Standards properties and measurements are shown in Table 1.

TABLE 1

Table 1: "Copolymer" Standards

| Wt % Comonomer | IR5 Area ratio | SCB/1000 Total C | $M_{w(GPC)}$ g/mol | $M_{w(GPC)}/M_{n(GPC)}$ |
|---|---|---|---|---|
| 0.0 | 0.1809 | 0.0 | 38,400 | 2.2 |
| 1.1 | 0.1810 | 1.4 | 107,000 | 2.1 |
| 5.4 | 0.1959 | 6.8 | 37,400 | 2.2 |
| 8.6 | 0.2043 | 10.8 | 36,800 | 2.2 |
| 9.4 | 0.2031 | 11.8 | 103,200 | 2.3 |
| 14.0 | 0.2152 | 17.5 | 36,000 | 2.2 |
| 14.3 | 0.2161 | 17.9 | 103,600 | 2.2 |
| 23.1 | 0.2411 | 28.9 | 37,300 | 2.2 |
| 35.9 | 0.2708 | 44.9 | 42,200 | 2.2 |
| 39.2 | 0.2770 | 49.0 | 125,600 | 2.2 |

The "IR5 Area Ratio (or "IR5 Methyl Channel Area/IR5 Measurement Channel Area")" of "the baseline-subtracted area response of the IR5 methyl channel sensor" to "the baseline-subtracted area response of IR5 measurement channel sensor" (standard filters and filter wheel as supplied by PolymerChar: Part Number IR5_FWM01 included as part of the GPC-IR instrument) was calculated for each of the "Copolymer" standards. A linear fit of the Wt % Comonomer versus the "IR5 Area Ratio" was constructed in the form of the following Equation 12:

$$\text{wt \% Comonomer} = A_0 + [A_1(IR5_{\textit{Methyl Channel Area}}/IR5_{\textit{Measurement Channel Area}})]$$ (Equation 12)

Therefore, a GPC-CC (GPC-Comonomer Content) plot (wt % comonomer vs. lgMW) can be obtained. End-Group Correction of the wt % Comonomer data can be made via knowledge of the termination mechanism if there is significant spectral overlap with the comonomer termination (methyls) via the molecular weight determined at each chromatographic slice.

Capillary Swell Testing Procedure

Capillary, or extrudate, or die swell testing is used to evaluate the average extrudate swell of a polymer strand leaving the die of an extruder, in a range of time representative of a manufacturing process, such as a blow molding process. A strand of polymer is produced by a piston-driven capillary rheometer (Göttfert Rheograph 2003 equipped with a 12 mm diameter barrel and a 1 mm diameter circular die of length 10 mm, with a 90° entrance angle) at an apparent wall shear rate of 1000 s-1 and at a temperature of 190° C. The volumetric flow rate is kept constant $$(Q = \frac{\pi}{4} R^3 \dot{\gamma}_{aw},$$

where Q is the volumetric flow rate, R is the radius of the circular die, and $\dot{\gamma}_{aw}$ is the apparent wall shear rate). The strand is cut at a distance of 4 cm from the die exit, and the timer is started. When the strand reaches a total length of 27 cm (namely, an incremental length of 23 cm after the timer started), the timer is stopped. High swell materials produce thicker extrudate whose length grows more slowly than that of lower swell materials. The recorded time for the strand to reach the incremental length of 23 cm relates to the extrudate swell. The measurement is repeated five times to account for measurement variability, and the average result is reported. The extrudate swell is reported as the time, t1000 seconds, required for the extrudate to cover the distance of 23 cm when extruded at a shear rate of 1000 l/s.

Rheological Properties

To measure the complex shear viscosity, storage modulus (G'), loss modulus (G") and tan □ (G"/G'), test samples are prepared from a compression molded plaque. A piece of aluminum foil is placed on a back plate, and a template or mold is placed on top of the back plate. Approximately 3.2 grams of resin is placed in the mold, and a second piece of aluminum foil is placed over the resin and mold. A second back plate is then placed on top of the aluminum foil. The total ensemble is put into a compression molding press and pressed for 6 min at 190° C. under 25,000 psi. The sample is then removed and laid on the counter to cool to room temperature. A 25 mm disk is stamped out of the compression-molded plaque. The thickness of this disk is approximately 3.0 mm.

The rheology measurement to determine the rheological properties at 1 and 100 radians/second (rad/s) are done in a nitrogen environment, at 190° C., and a strain of 10%. The stamped-out disk is placed between the two "25 mm" parallel plates located in an ARES-1 (Rheometrics SC) rheometer oven, which is preheated, for at least 30 minutes, at 190° C., and the gap of the "25 mm" parallel plates is slowly reduced to 2.0 mm. The sample is then allowed to remain for exactly 5 minutes at these conditions. The oven is then opened, the excess sample is carefully trimmed around the edge of the plates, and the oven is closed. The method has an additional five minute delay built in, to allow for temperature equilibrium. Then the complex shear viscosity is determined via a small amplitude, oscillatory shear, according to an increasing frequency sweep from 0.1 to 100 rad/s. The complex viscosities, storage modulus (G'), loss modulus (G") and tan □ (G"/G') at 1 rad/s and 100 rad/s are then obtained. Shear viscosity ratio is defined as the ratio of the complex shear viscosity at 1 rad/s to the complex shear viscosity at 100 rad/s.

Environmental Stress Crack Resistance (ESCR)

To measure ESCR, the pellet samples were compression molded at 190° C. into a 0.075 inch sheet according to ASTM D4703 per Annex A.1 Procedure C. The compression molded sheet was conditioned at 23° C. (+/−2° C.) and 50% RH (+/−5% RH) for at least 24 hours before the individual coupons were stamped out using an appropriate die. The coupon dimensions were 38 mm×13 mm with a thickness of 1.90 mm. The coupons were further conditioned at 23° C. (+/−2° C.) and 50% RH (+/−5% RH) and tested at least 40 hours after compression molding and within 96 hours of compression molding. ESCR was measured according to ASTM-D 1693-01, Condition B. The sample thickness was measured to ensure they were within the ASTM 1693-01 specifications. Immediately prior to testing, the samples were notched to the required depth and then bent and loaded into the specimen holder. The holder was then placed in a test tube filled with a 10 percent, by volume, Igepal CO-630 (vendor Rhone-Poulec, N.J.) aqueous solution, maintained at 50° C. The F50 failure time is reported.

Modulus

2% Secant flexural modulus is measured according to ASTM D790. The specimen is prepared via compression molding according to ASTM D4703 and is tested by 3 point deflection with a standard span of 2 inches with a specimen thickness of 0.12-0.13 inches. Test speed is 0.5 inch/minute. Standard specimen is ½ inch wide by 5 inches long. Specimen is tested to 5% strain with modulus. 2% secant modulus is reported.

EXAMPLES

The following examples illustrate one or more additional features of the present disclosure described above.

Example 1 Resin

Example 1 Resin was a bimodal polyethylene produced using gas phase polymerization in a single-reactor. The main catalyst, PRODIGY™ BMC-300, commercially available from Univation Technologies (Houston, Tex.) was fed to a UNIPOL™ polyethylene reactor via a ¼" injection tube. Trim catalyst that was made as a mixture of 0.04 wt % bis(n-butylcyclopentadienyl)zirconium dimethyl in isopentane was fed into the same ¼" injection tube at a rate sufficient to provide the desired resin flow index. The reactor gas composition was controlled by metering the feeds to the reactor at a rate sufficient to maintain 220 psi ethylene partial pressure, 0.0009 n-hexene/C2 molar ratio, 0.0007 H2/C2 molar ratio and 15.2 mol % isopentane. CA-300, an additive commercially available from Univation Technologies (Houston, Tex.) is separately fed to the reactor to maintain a concentration of about 45 ppmw based on ethylene feed rate to the reactor. The reactor temperature is nominally 105° C. and the reactor residence time is ca. 2.8 hours. The reactor bed weight is maintained by discharging granular resin into a discharge tank where it is purged with nitrogen before being dumped into a fiberpack that is again purged with a steam/nitrogen mixture. The flow index of the ethylene-based polymer is controlled by adjusting the ratio of the main catalyst feed to the trim catalyst feed, where higher ratios raise the flow index of the resultant polymer. Example 1 Resin has a split of 34.7 wt %.

Example 2 Resin

Example 2 Resin was a bimodal polyethylene produced using gas phase polymerization in a single-reactor. The main catalyst, PRODIGY™ BMC-300, was fed to a UNIPOL™ polyethylene reactor via a ¼" injection tube. Trim catalyst that was made as a mixture of 0.04 wt % bis(n-butylcyclopentadienyl)zirconium dimethyl in Isopar™ C (available from the Exxon-Mobil corporation) was fed into the same ¼" injection tube at a rate sufficient to provide the desired resin flow index. The reactor gas composition was controlled by metering the feeds to the reactor at a rate sufficient to maintain 220 psi ethylene partial pressure, 0.0009 n-hexene/C2 molar ratio, 0.0006 H2/C2 molar ratio and 6.0 mol % isopentane. CA-300 additive was separately fed to the reactor to maintain a concentration of about 45 ppmw based on ethylene feed rate to the reactor. The reactor temperature was nominally 86° C. and the reactor residence time was ca. 4.5 hours. The reactor bed weight was maintained by discharging granular resin into a discharge tank where it was purged with nitrogen before being dumped into an open container that is again purged with a steam/nitrogen mixture. The flow index of the ethylene-based polymer was controlled by adjusting the ratio of the main catalyst feed to the trim catalyst feed, where higher ratios raise the flow index of the resultant polymer. Example 2 Resin has a split of 33.8 wt %.

Example 3 Resin

Example 3 Resin was a bimodal polyethylene produced using gas phase polymerization in a single-reactor. The main catalyst, spray-dried bis(2-pentamethylphenylamido)ethyl) amine zirconium dibenzyl, (cyclopentadienyl)(1,3-dimethyl-tetrahydroindenyl) zirconium dimethyl, methylalumoxane (MAO) and CAB-O-SIL TS-610 brand fumed silica in mineral oil slurry, was fed to a UNIPOL™ polyethylene reactor via a ¼" injection tube. Trim catalyst that was made as a mixture of 0.04 wt % (cyclopentadienyl)(1,3-dimethyl-tetrahydroindenyl) zirconium dimethyl in isopentane was fed into the same ¼" injection tube at a rate sufficient to provide the desired resin flow index. The reactor gas composition was controlled by metering the feeds to the reactor at a rate sufficient to maintain 220 psi ethylene partial pressure, 0.0009 n-hexene/C2 molar ratio, 0.0010 H2/C2 molar ratio and 11.4 mol % isopentane. CA-300 additive was separately fed to the reactor to maintain a concentration of about 45 ppmw based on ethylene feed rate to the reactor. The reactor temperature was nominally 95° C. and the reactor residence time was ca. 2.5 hours. The reactor bed weight was maintained by discharging granular resin into a discharge tank where it was purged with nitrogen before being dumped into an open container that was again purged with a steam/nitrogen mixture. The flow index of the ethylene-based polymer was controlled by adjusting the ratio of the main catalyst feed to the trim catalyst feed, where higher ratios raised the flow index of the resultant polymer. Example 3 Resin has a split of 27.9 wt %.

Comparative Example 5 Resin

For Comparative Example 5 Resin, the catalyst PRODIGY™ BMC-300, was fed to a UNIPOL™ polyethylene reactor via a ¼" injection tube. Trim catalyst that was made as a mixture of 0.04 wt % bis(n-butylcyclopentadienyl)zirconium dimethyl in isopentane was fed into the same ¼" injection tube at a rate sufficient to provide the desired resin flow index. The reactor gas composition was controlled by metering the feeds to the reactor at a rate sufficient to maintain 220 psi ethylene partial pressure, 0.0007 n-hexene/C2 molar ratio, 0.0014 H2/C2 molar ratio and 15.1 mol % isopentane. CA-300 additive was separately fed to the reactor to maintain a concentration of about 45 ppmw based on ethylene feed rate to the reactor. The reactor temperature was nominally 105° C. and the reactor residence time was ca. 2.6 hours. The reactor bed weight was maintained by discharging granular resin into a discharge tank where it was purged with nitrogen before being dumped into a fiberpack that was again purged with a steam/nitrogen mixture. The flow index of the ethylene-based polymer was controlled by adjusting the ratio of the main catalyst feed to the trim catalyst feed, where higher ratios raised the flow index of the resultant polymer. Comparative Example 5 Resin has a split of 36.3 wt %.

Comparative Example 6 Resin

For the Comparative Example 6 Resin, the bimodal polyethylene was produced using gas phase polymerization in a single-reactor. The main catalyst, PRODIGY™ BMC-300 was fed to a UNIPOL™ polyethylene reactor via ¼" injection tube. Trim catalyst that was made as a mixture of 0.04 wt % bis(n-butylcyclopentadienyl)zirconium dimethyl in isopentane was fed into the same ¼" injection tube at a rate sufficient to provide the desired resin flow index. The reactor gas composition is controlled by metering the feeds to the reactor at a rate sufficient to maintain 220 psi ethylene partial pressure, 0.0005 n-hexene/C2 molar ratio, 0.0004 H2/C2 molar ratio and 6.0 mol % isopentane. CA-300 additive was separately fed to the reactor to maintain a concentration of about 45 ppmw based on ethylene feed rate to the reactor. The reactor temperature was nominally 86° C. and the reactor residence time was ca. 4.6 hours. The reactor bed weight was maintained by discharging granular resin into a discharge tank where it was purged with nitrogen before being dumped into an open container that was again purged with a steam/nitrogen mixture. The flow index of the ethylene-based polymer was controlled by adjusting the ratio of the main catalyst feed to the trim catalyst feed, where higher ratios raised the flow index of the resultant polymer. Comparative Example 6 Resin has a split of 20.5 wt %.

The reactor process conditions are shown in Table 2.

TABLE 2

Table 2: Reactor Process Conditions

| Example # | Example 1 | Example 2 | Example 3 | Comp. Example 5 | Comp. Example 6 |
|---|---|---|---|---|---|
| Reactor Bed Temperature, ° C. | 105 | 86 | 95 | 105 | 86 |
| Reactor Total Pressure, psig | 350 | 300 | 350 | 350 | 300 |
| Bed Weight, lbs | 104 | 475 | 99 | 105 | 473 |
| Bed Height, feet | 6.2 | 18.5 | 6.2 | 6.1 | 22.2 |
| Reactor Gas Velocity, ft/s | 1.76 | 1.95 | 2.03 | 1.84 | 1.94 |
| Ethylene Partial Pressure, psi | 220 | 220 | 220 | 220 | 220 |
| $C_6/C_2$ molar ratio | 0.0009 | 0.0009 | 0.0009 | 0.0007 | 0.0005 |
| $H_2/C_2$ molar ratio | 0.0007 | 0.0006 | 0.0010 | 0.0014 | 0.0004 |
| Isopentane mol % | 15.2 | 6.0 | 11.4 | 15.1 | 6.0 |

Referring to Table 3 below, Mn(GPC), Mw(GPC), Mz(GPC), Mw(GPC)/Mn(GPC), and Mp(GPC) for two example polyethylene formulation embodiments in accordance with the present disclosure and many comparative formulations were obtained using GPC. Weight fractions are reported in Table 4.

TABLE 3

Table 3: GPC Determined Molecular Weight Values of Various Formulations

| Example | Resin | $M_{n(GPC)}$ (g/mol) | $M_{w(GPC)}$ (g/mol) | $M_{z(GPC)}$ (g/mol) | $M_{w(GPC)}/M_{n(GPC)}$ | $M_{p(GPC)}$ (g/mol) | $lg(M_{p(GPC)})$ |
|---|---|---|---|---|---|---|---|
| Example 1 | Example 1 Resin | 23,543 | 468,636 | 3,861,814 | 19.9 | 47,863 | 4.68 |
| Example 2 | Example 2 Resin | 23,470 | 396,271 | 2,962,399 | 16.9 | 44,668 | 4.65 |
| Example 3 | Example 3 Resin | 27,872 | 353,790 | 3,180,835 | 12.7 | 48,978 | 4.69 |
| Comparative Example 1 | MARLEX ™ HXB-TR512 (Chevron Phillips) | 17,683 | 329,618 | 3,148,386 | 18.6 | 61,659 | 4.79 |
| Comparative Example 2 | PAXON ™ HYA-021L (Exxon Mobil) | 14,516 | 365,486 | 3,698,351 | 25.2 | 56,234 | 4.75 |
| Comparative Example 3 | PAXON ™ FD60-018 (Exxon Mobil) | 32,110 | 381,541 | 2,941,204 | 11.9 | 83,176 | 4.92 |

TABLE 3-continued

Table 3: GPC Determined Molecular Weight Values of Various Formulations

| Example | Resin | $M_{n(GPC)}$ (g/mol) | $M_{w(GPC)}$ (g/mol) | $M_{z(GPC)}$ (g/mol) | $M_{w(GPC)}/M_{n(GPC)}$ | $M_{p(GPC)}$ (g/mol) | $lg(M_{p(GPC)})$ |
|---|---|---|---|---|---|---|---|
| Comparative Example 4 | NOVAPOL ™ HB-W555A (Nova Chemicals) | 20,335 | 363,552 | 3,548,615 | 17.9 | 54,954 | 4.74 |
| Comparative Example 5 | Comparative Example 5 Resin | 14,397 | 368,645 | 2,955,185 | 25.6 | 33,113 | 4.52 |
| Comparative Example 6 | Comparative Example 6 Resin | 30,346 | 373,382 | 3,007,670 | 12.3 | 69,183 | 4.84 |

TABLE 4:

Table 4: Weight Fractions of Various Formulations

| Example | Weight fraction (w1) of molecular weight (MW) less than 10,000 g/mol (%) | Weight fraction (w2) of molecular weight (MW) greater than 1,000,000 g/mol (%) | Weight fraction (w3) of lg(MW) between $lg(M_{p(GPC)} - 0.25$ and $lg(M_{p(GPC)} + 0.25$ (%) |
|---|---|---|---|
| Example 1 | 7.5 | 11.6 | 30.6 |
| Example 2 | 8.6 | 10.7 | 31.4 |
| Example 3 | 6.8 | 8.7 | 36.2 |
| Comparative Example 1 | 11.1 | 7.0 | 28.1 |
| Comparative Example 2 | 14.0 | 7.8 | 26.1 |
| Comparative Example 3 | 6.7 | 8.5 | 28.5 |
| Comparative Example 4 | 11.2 | 7.9 | 27.7 |
| Comparative Example 5 | 14.9 | 9.6 | 26.0 |
| Comparative Example 6 | 6.0 | 9.4 | 34.5 |

Density was measured according to ASTM D792. I21 was measured according to ASTM D1238 at 190° C. and 21.6 kg. I5 was measured according to ASTM D1238 at 190° C. and 5.0 kg. Capillary swell testing, rheological properties measurements, and ESCR measurements were performed according to the methods described above. The results are reported in Table 5 and Table 6.

TABLE 5

Table 5: Properties of Various Formulations

| Example | Density (g/cm³) | $I_{21}$ (g/10 min) | $I_{21}/I_5$ | 2% Secant Flexural Modulus ksi | Capillary Swell, t1000 seconds | ESCR (10% Igepal), $F_{50}$ hours |
|---|---|---|---|---|---|---|
| Example 1 | 0.952 | 5.3 | 30 | 140 | 8 | 557 |
| Example 2 | 0.955 | 7.1 | 30 | 128 | 8.3 | 380 |
| Example 3 | 0.955 | 7.6 | 29 | 156 | 9.1 | 481 |
| Comparative Example 1 | 0.954 | 5.5 | 24 | 154 | 9 | 125 |
| Comparative Example 2 | 0.955 | 5 | 30 | 157 | 9.2 | 132 |
| Comparative Example 3 | 0.952 | 0.9 | NM* | 163 | 6.2 | 97 |
| Comparative Example 4 | 0.955 | 4.9 | 30 | 162 | 9.2 | 116 |
| Comparative Example 5 | 0.956 | 7.4 | 48 | 170 | 5.3 | 323 |
| Comparative Example 6 | 0.955 | 6.7 | 23 | 131 | 9.1 | 102 |

*NM not measurable due to unmeasurable I5

TABLE 6

Table 6: Rheological Properties of Various Formulations

| | G' at 1 rad/s (Pa) | G" at 1 rad/s (Pa) | Complex Shear Viscosity at 1 rad/s (Pa*s) | tan(δ) at 1 rad/s | G' at 100 rad/s (Pa) | G" at 100 rad/s (Pa) | Complex Shear Viscosity at 100 rad/s (Pa*s) | tan(δ) at 100 rad/s | Shear Viscosity Ratio |
|---|---|---|---|---|---|---|---|---|---|
| Example 1 | 53,959 | 40,253 | 67,319 | 0.75 | 271,000 | 143,480 | 3,066 | 0.53 | 22.0 |
| Example 2 | 47,386 | 31,025 | 56,653 | 0.66 | 213,737 | 117,203 | 2,440 | 0.55 | 23.2 |
| Example 3 | 34,289 | 28,042 | 44,309 | 0.82 | 201,759 | 123,352 | 2,365 | 0.61 | 18.7 |
| Comparative Example 1 | 26,297 | 27,801 | 38,268 | 1.06 | 242,450 | 148,560 | 2,843 | 0.61 | 13.5 |
| Comparative Example 2 | 29,228 | 27,473 | 40,112 | 0.94 | 227,200 | 131,580 | 2,625 | 0.58 | 15.3 |
| Comparative Example 3 | 83,100 | 43,474 | 93,785 | 0.52 | 340,710 | 155,010 | 3,743 | 0.45 | 25.1 |
| Comparative Example 4 | 31,323 | 28,850 | 42,585 | 0.92 | 237,290 | 138,350 | 2,747 | 0.58 | 15.5 |
| Comparative Example 5 | 42,592 | 36,823 | 56,303 | 0.86 | 228,502 | 93,023 | 2,467 | 0.41 | 22.8 |
| Comparative Example 6 | 32,544 | 24,199 | 40,557 | 0.74 | 216,498 | 149,540 | 2,623 | 0.69 | 15.5 |

As shown in Tables 3-6, Examples 1 and 2 have an Mp(GPC) of less than 50,000 g/mol, an Mn(GPC) of less than 30,000 g/mol, and a weight fraction (w1) of molecular weight (MW) less than 10,000 g/mol of 10.5 wt % or less. Each of Examples 1 and 2 exhibited a capillary swell above 7.5 seconds and an ESCR above 350 hours. While Comparative Examples 3 and 6 had a weight fraction (w1) of molecular weight (MW) less than 10,000 g/mol of less than 10.5 wt %, they each had an Mn(GPC) greater than 30,000 g/mol and an Mp(GPC) greater than 50,000 g/mol. Consequently, Comparative Examples 3 and 6 both exhibited poor ESCR, and Comparative Example 3 also had a poor die swell.

Conversely, Comparative Example 5 has an Mp(GPC) of less than 50,000 g/mol and an Mn(GPC) of less than 30,000 g/mol, but a weight fraction (w1) of molecular weight (MW) less than 10,000 g/mol of 14.98 wt %, well above the 10.5 wt % claimed upper limit. As a result, it demonstrated a poor die swell value.

Additionally, as demonstrated by Examples 1 and 2, the polyethylene formulation had a weight fraction (w3) of lg(MW) between $\lg(M_{p(GPC)})-0.25$ and $\lg(M_{p(GPC)})+0.25$ of from 29 wt % to 32 wt % or even from 30 wt % to 32 wt %, while each of the Comparative Examples had less than 29 wt % or greater than 33 wt %.

While use of relative terms, such as greater than, less than, upper, and lower, are used above to describe various aspects, including but not limited to swell characteristics, component weight, hydrogen to ethylene ratio, and the like, such terms are used relative to one another or comparatively, and are thus readily understandable to those of ordinary skill in the art with respect to the metes and bounds inferred by the use of such terms.

It should be apparent to those skilled in the art that various modifications can be made to the described embodiments without departing from the spirit and scope of the claimed subject matter. Thus, it is intended that the specification cover modifications and variations of the described embodiments provided such modification and variations come within the scope of the appended claims and their equivalents.

The invention claimed is:

1. A polyethylene formulation having a density of greater than 0.940 g/cm³ when measured according to ASTM D792, a high load melt index ($I_{21}$) of 1 to 10 g/10 min when measured according to ASTM D1238 at 190° C. and a 21.6 kg load, a peak molecular weight ($M_{p(GPC)}$) of less than 50,000 g/mol, a number average molecular weight ($M_{n(GPC)}$) of less than 30,000 g/mol, and a weight fraction (w1) of molecular weight (MW) less than 10,000 g/mol of less than or equal to 10.5 wt %, as determined by Gel Permeation Chromatography (GPC).

2. The polyethylene formulation of claim 1, wherein the peak molecular weight ($M_{p(GPC)}$) is less than 49,000 g/mol, as determined by Gel Permeation Chromatography (GPC).

3. The polyethylene formulation of claim 1, wherein the weight fraction (w1) of molecular weight (MW) less than 10,000 g/mol is less than or equal to 10.0 wt %, as determined by Gel Permeation Chromatography (GPC).

4. The polyethylene formulation of claim 1, wherein a weight fraction (w2) of molecular weight (MW) greater than 1,000,000 g/mol is greater than or equal to 9.0 wt %, as determined by Gel Permeation Chromatography (GPC).

5. The polyethylene formulation of claim 1, wherein the polyethylene formulation has an $I_{21}/I_5$ ratio of 15 to 35, wherein $I_5$ is measured according to ASTM D1238 at 190° C. and a 5.0 kg load.

6. The polyethylene formulation of claim 1, wherein the polyethylene formulation has a complex shear viscosity at 100 rad/s and 190° C. of less than or equal to 3,500 Pa*s.

7. The polyethylene formulation of claim 1, wherein the polyethylene formulation has a complex shear viscosity at 1 rad/s and 190° C. of greater than or equal to 45,000 Pa*s.

8. The polyethylene formulation of claim 1, wherein the polyethylene formulation has a capillary swell (t1000) of greater than or equal to 7.5 seconds.

9. The polyethylene formulation of claim 1, wherein the polyethylene formulation has an environmental stress crack resistance $F_{50}$ of greater than 150 hours when measured according to ASTM D1693, Procedure B, 10% Igepal.

10. An article manufactured using a polyethylene having a density of greater than 0.940 g/cm³ when measured according to ASTM D792, a high load melt index ($I_{21}$) of 1 to 10 g/10 min when measured according to ASTM D1238 at 190° C. and a 21.6 kg load, a peak molecular weight ($M_{p(GPC)}$) of less than 50,000 g/mol, a number average molecular weight ($M_{n(GPC)}$) of less than 30,000 g/mol, and a weight fraction (w1) of molecular weight (MW) less than 10,000 g/mol of less than or equal to 10.5 wt %, as determined by Gel Permeation Chromatography (GPC).

11. The article of claim 10, wherein the article is a blow molded article.

12. The article of claim 10, wherein the peak molecular weight ($M_{p(GPC)}$) is less than 49,000 g/mol, as determined by Gel Permeation Chromatography (GPC).

13. The article of claim 10, wherein the weight fraction (w1) of molecular weight (MW) less than 10,000 g/mol is less than or equal to 10.0 wt %, as determined by Gel Permeation Chromatography (GPC).

14. The article of claim 10, wherein a weight fraction (w2) of molecular weight (MW) greater than 1,000,000 g/mol is greater than or equal to 9.0 wt %, as determined by Gel Permeation Chromatography (GPC).

15. The article of claim 10, wherein the polyethylene formulation has an $I_{21}/I_5$ ratio of 15 to 35, wherein $I_5$ is measured according to ASTM D1238 at 190° C. and a 5.0 kg load.

16. The article of claim 10, wherein the polyethylene formulation has a complex shear viscosity at 100 rad/s and 190° C. of less than or equal to 3,500 Pa*s.

17. The article of claim 10, wherein the polyethylene formulation has a complex shear viscosity at 1 rad/s and 190° C. of greater than or equal to 45,000 Pa*s.

18. The article of claim 10, wherein the polyethylene formulation has a capillary swell (t1000) of greater than or equal to 7.5 seconds.

19. The article of claim 10, wherein the polyethylene formulation has an environmental stress crack resistance $F_{50}$ of greater than 150 hours when measured according to ASTM D1693, Procedure B, 10% Igepal.

* * * * *